United States Patent [19]
Yerves, Jr. et al.

[11] Patent Number: 5,335,589
[45] Date of Patent: Aug. 9, 1994

[54] MULTIPLE BEVERAGE DISPENSER

[76] Inventors: Kenneth A. Yerves, Jr., 32 Rollstone Ave., West Sayville; William R. Seegull, 608 Birchwood Park Dr., Middle Island, N.Y.

[21] Appl. No.: 100,272

[22] Filed: Aug. 2, 1993

[51] Int. Cl.$^5$ .............................................. A47J 31/14
[52] U.S. Cl. ....................................... 99/295; 99/306; 99/289 R; 215/6; 222/144.5
[58] Field of Search ................. 99/279, 295, 306, 305, 99/300, 289 R; 222/144.5, 129, 465.1, 475.1; 215/6

[56] References Cited
U.S. PATENT DOCUMENTS

| | | | |
|---|---|---|---|
| 4,651,900 | 3/1987 | Horvath | 222/144.5 |
| 4,703,871 | 11/1987 | Broker | 222/465.1 |
| 4,901,630 | 2/1990 | Hall | 99/295 |

*Primary Examiner*—Robert W. Jenkins
*Attorney, Agent, or Firm*—Michael I. Kroll

[57] ABSTRACT

A multiple beverage dispenser is provided which consists of a container having an opened neck. A handle on said container is to be gripped by a hand of a person. A structure within the container is for dividing the container into two separate compartments for holding two different types of beverages therein. A mechanism is on the opened neck of the container for selectively discharging each of the beverages from each compartment within the container. The dispenser can be used in conjunction with a dual system electronic coffee maker, to receive any combination of brewed coffee.

14 Claims, 4 Drawing Sheets

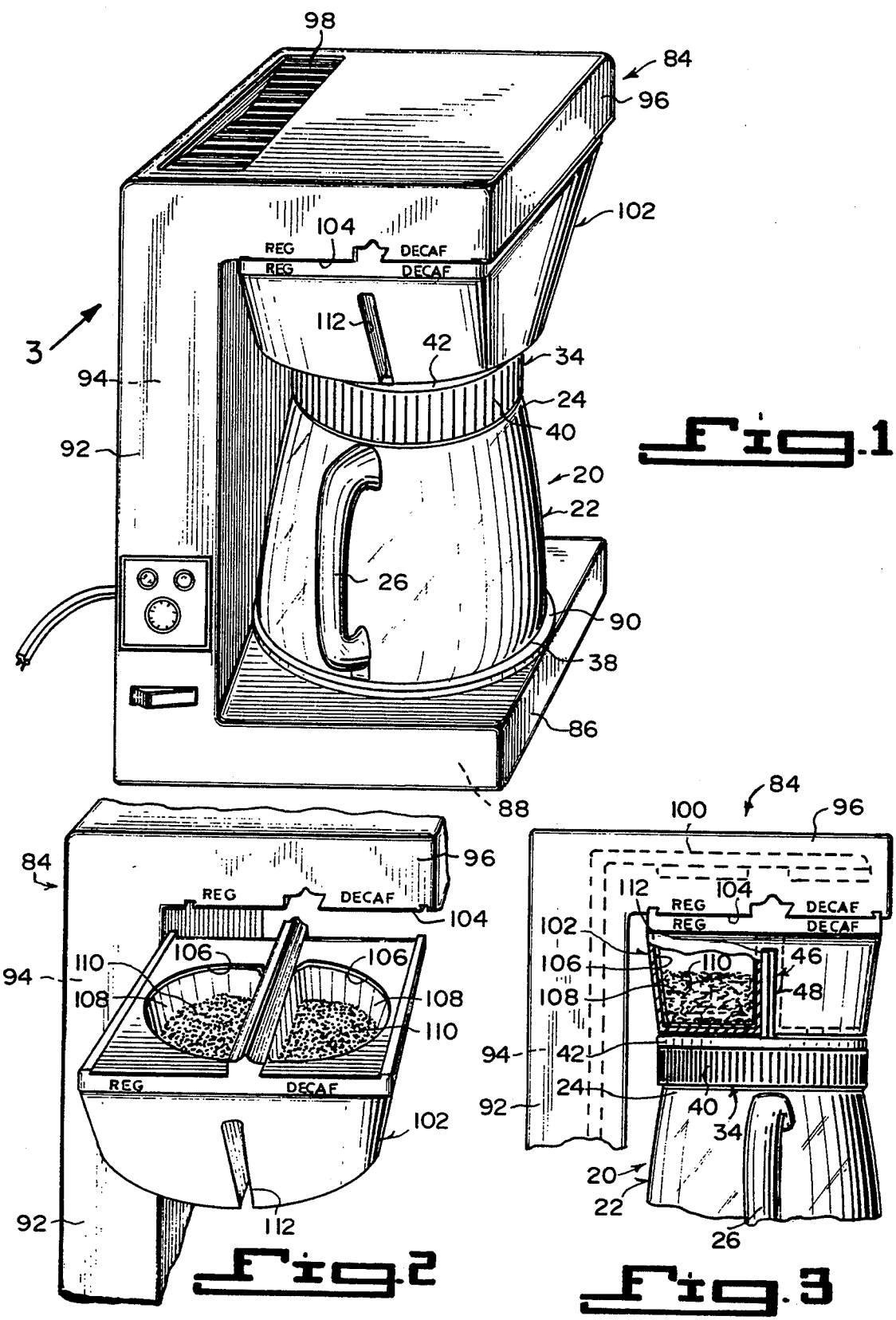

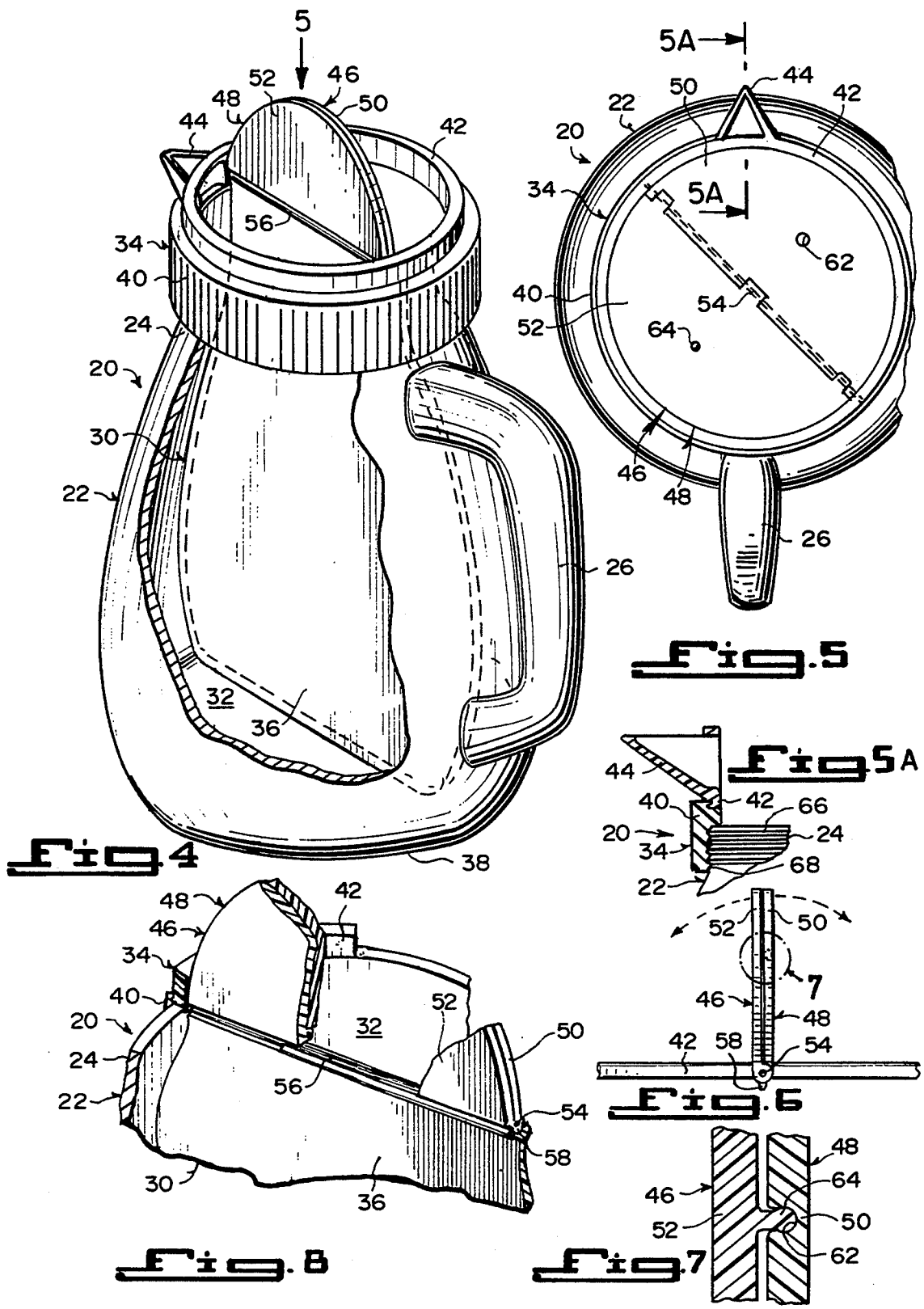

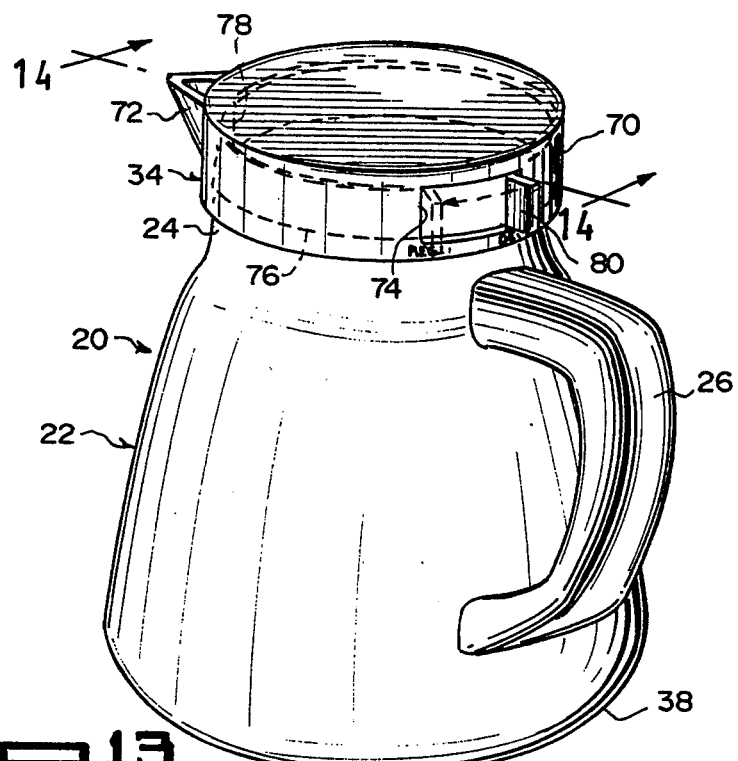
_Fig.13_
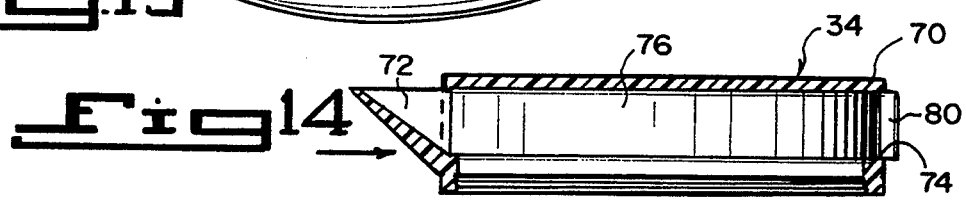
_Fig.14_
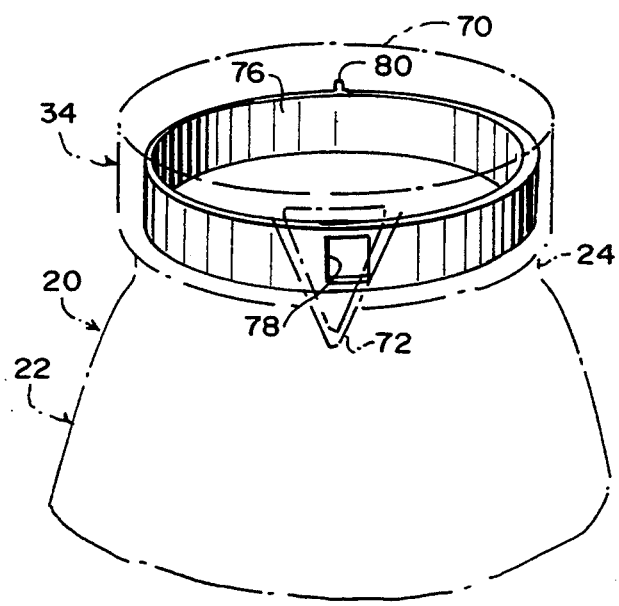
_Fig.15_
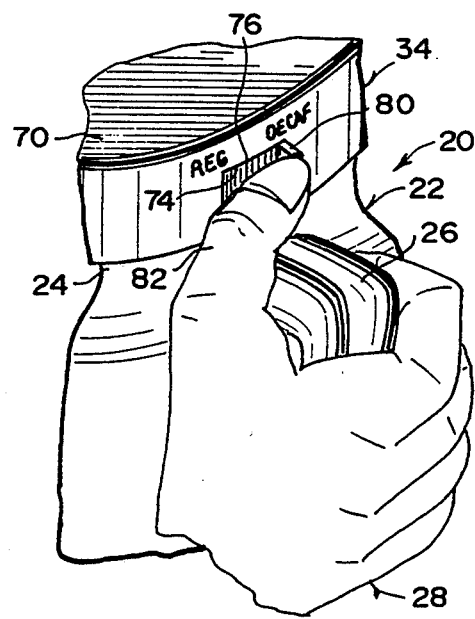
_Fig.16_

MULTIPLE BEVERAGE DISPENSER

BACKGROUND OF THE INVENTION

1. Field of the Invention

The instant invention relates generally to containers and more specifically it relates to a multiple beverage dispenser.

2. Description of the Prior Art

Numerous containers have been provided in prior art that are adapted to allow their contents to be taken out and used in convenient or prescribed amounts. While these units may be suitable for the particular purpose to which they address, they would not be as suitable for the purposes of the present invention as heretofore described.

SUMMARY OF THE INVENTION

A primary object of the present invention is to provide a multiple beverage dispenser that will overcome the shortcomings of the prior art devices.

Another object is to provide a multiple beverage dispenser that contains a handle to be gripped by a hand of a person, that will hold two different beverages separately therein, so as to be selectively discharged therefrom by the manipulation of the person gripping the handle.

An additional object is to provide a multiple beverage dispenser that can be used in conjunction with a dual system electronic coffee maker, so that the dispenser can receive any combination of brewed coffee, such as regular and decal from the coffee maker.

A further object is to provide a multiple beverage dispenser that is simple and easy to use.

A still further object is to provide a multiple beverage dispenser that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the instant invention being used in conjunction with a dual system electronic coffee maker.

FIG. 2 is a perspective view of a portion of the dual system electronic coffee maker showing the dual filter basket separated therefrom.

FIG. 3 is a front elevational view taken in direction of arrow 3 in FIG. 1, with parts broken away and in section.

FIG. 4 is a perspective view of the instant invention per se with parts broken away and the lid in an opened position.

FIG. 5 is a top view taken in direction of arrow 5 in FIG. 4 with the lid in a closed position.

FIG. 5A is a cross sectional view taken along line 5A—5A in FIG. 5, showing the collar and neck threaded together.

FIG. 6 is an elevational view of the lid per se in the opened position with parts broken away.

FIG. 7 is an enlarged cross sectional view as indicated by arrow 7 in FIG. 6, showing the mechanism for retaining the lid in the opened position.

FIG. 8 is a perspective view with parts broken away nd in section showing the lid in the opened position.

FIG. 13 is a rear perspective view of a second embodiment of the instant invention.

FIG. 14 is a side cross sectional view taken along line 14—14 in FIG. 13 through the pouring spout cap.

FIG. 15 is a front perspective view of the selector band with the pouring spout cap and container shown in phantom.

FIG. 16 is a rear perspective view of a portion of the second embodiment showing a thumb operation of the selector band in the pouring spout cap.

DETAILED DESCRIPTION OF THE PREFERRED EMBODIMENTS

Figures 9, 10, 11:
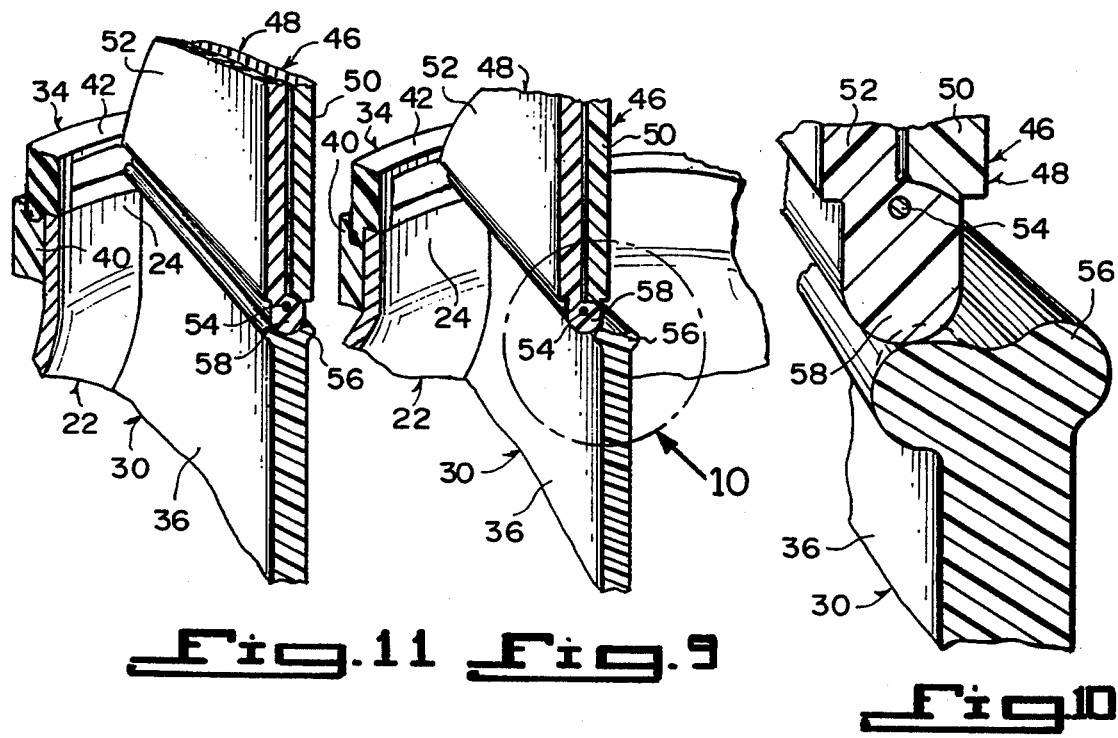
FIG. 9 is a cross sectional perspective view with parts broken away showing the lid in the opened position and the cam portion out of alignment with the cam seat on the partition.
FIG. 10 is an enlarged cross sectional perspective view as indicated by arrow 10 in FIG. 9, showing the cam seat being deflected by the cam portion of the lid.
FIG. 11 is a view similar to FIG. 9, showing the cam portion of the lid in alignment with the cam seat on the partition.

Turning now descriptively to the drawings, in which similar reference characters denote similar elements throughout the several views, FIGS. 1 through 16 illustrate a multiple beverage dispenser 20, which consists of a container 22 having an opened neck 24. A handle 26 is on the container to be gripped by a hand 28 of a person. A structure 30 within the container 22 is for dividing the container 22 into two separate compartments 32, for holding two different types of beverages therein. A mechanism 34 is on the opened neck 24 of the container 22, for selectively discharging each of the beverages from each compartment 32 within the container 22.

The dividing structure 22 is a partition 36, extending down from the open neck 24 to the bottom 38 of the container 22. The selectively discharging mechanism 34 includes a collar 40 which fits about the opened neck 24 of the container 22. A ring 42, having a pouring spout 44 rides upon the collar 40. The ring 42 can be manually manipulated on the collar 40, to position the pouring spout 44 over one of the compartments 32.

The multiple beverage dispenser 20 further contains an apparatus 46, for covering the compartments 32 within the container 22, after the two different types of beverages are deposited therein. The covering apparatus 46 is a disc shaped lid 48, which fits into the ring 42. The disc shaped lid 48 is divided into two semicircular segments 50, 52, which are held together by a hinge 54, so that each semicircular segment 50, 52 can cover over one compartment 32.

The partition 36 has a flexible cam seat 56 along a top edge. The disc shaped lid 48 has a cam portion 58 along the hinge 54. The disc shaped lid 48 in an opened position can be adjusted, allowing said can portion 58 to sit properly on the flexible cam seat 56. A fastener 60 is for retaining the semicircular segments 50, 52 in the opened position. The fastener 60, as best seen in FIG. 7, consists of a female socket 62 formed in a top surface of the first semicircular segment 50. A male plug 64 is formed on a top surface of the second semicircular segment 52. When the disc shaped lid 48 is in the opened position, the male plug 64 will mate with the female socket 62.

As shown in FIG. 5A, the opened neck 24 has external threads 66 thereabout. The collar 40 has internal threads 68, which engage with the external threads 66 on the opened neck 24.

Another selectively discharging mechanism 34 is shown in FIGS. 13 to 16 and includes a cap 70 having a pouring spout 72 and a window 74 opposite from the pouring spout 72. The cap 70 fits onto the opened neck 24 of the container 22. A selector band 76 has an aperture 78 and a flyer flange 80 opposite from the aperture 78. The selector band 76 rotatively fits within the cap 70, with the aperture 78 at the pouring spout 72 and the finger flange 80 extending through the window 74. A thumb 82 of a hand 28 gripping the handle 26 can slide the finger flange 80 left and right, to move the aperture 78 at the pouring spout 72 back and fourth over one of the compartments 32.

A dual system electronic coffee maker 84, as shown in FIGS. 1 to 3 and 12 is provided, so that compartments 32 within the container 22 can receive separately any combination of brewed coffee, such as regular and decaf from the coffee maker 84. The coffee maker 24, as shown in FIGS. 1 to 3 includes a base 86 having a heating coil 88 therein. A hot plate 90 is mounted on the base 86 which the container 22 sits upon. A stanchion support 92 having a water reservoir 94 therein, extends upwardly from the base 86. An overhead portion 96 having a fill opening 98 and a dual water feed system 100, extends outwardly from the stanchion support 92. A removable filter basket 102 is carried on the underside 104 of the overhead portion 96, over the container 22. The filter basket 102 has two chambers 106, in which each receives a filter 108 and a measure of ground coffee 110. When a pre-measured quantity of water is introduced through the fill opening 98, the water in the reservoir 94 will be heated to a brewing temperature, travel through the dual water feed system 100 and go into each chamber 106 past the ground coffee 110 and filter 108, to be discharged into each compartment 32 in the container 22.

The removable filter basket 102 has a slot 112 extending upwardly between the chambers 106. The semicircular segments 50, 52 of the disc shaped lid 48 in the opened position can fit into the slot, so as to allow the container 22 to be placed in a proper orientation onto the hot plate 90.

Figure 12:
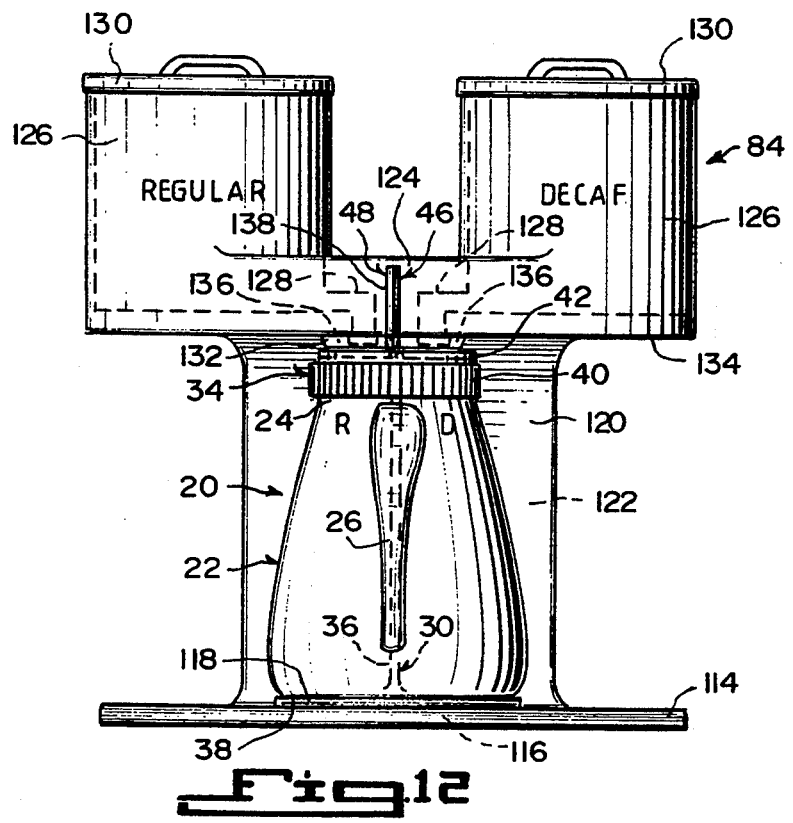
FIG. 12 is a front elevational view of the instant invention being used in conjunction with another type of dual system electronic coffee maker.

The coffee maker 84, shown in FIG. 12, includes a base 114 having a heating coil 116 therein. A hot plate 118 is mounted on the base 114 which the container 22 sits upon. A stanchion support having a water reservoir 122 therein, extends upwardly from the base 114. An overhead portion 124 extends outwardly from the stanchion support 120. A pair of receptacles 126 extends upwardly from the overhead portion 124. Each receptacle 126 has an open top to receive a measure of ground coffee and water feed system 128. A pair of removable covers 130 fit over the open tops of the receptacles 126. A filter housing 132 is on the underside 134 of the overhead portion 124 over the container 22. The filter housing 132 has two chambers 136, in which each receives a filter and is fluidly connected to one water feed system 128. When a pre-measured quantity of water is introduced into the water reservoir 122 and the stanchion support 120 is heated to a brewing temperature, it will travel into each receptacle 126 past the ground coffee through each water feed system 128 and go into each chamber 136, past the filter to be discharged into each compartment 32 in the container 22.

The overhead portion 124 with the filter housing 132 has a slot 138 extending upwardly between the chambers 136. The semicircular segments 50, 52 of the disc shaped lid 48 in the opened position can fit into the slot 138, so as to allow the container 22 to be placed in a proper orientation onto the hot plate 118.

LIST OF REFERENCE NUMBERS 20 multiple beverage dispenser
22 container
24 open neck of 22
26 handle on 22
28 hand
30 dividing structure in 22
32 compartment in 22
34 selectively discharging mechanism on 24
36 partition for 30
38 bottom of 22
40 collar
42 ring
44 pouring spout in 42
46 covering apparatus
48 disc shaped lid for 46
50 first semicircular segment of 48
52 second semicircular segment of 48
54 hinge between 50, 52
56 flexible cam seat on 36
58 cam portion under 54
60 fastener 60
62 female socket in 50
64 male plug on 52
66 external threads on 24
68 internal threads in 40
70 cap
72 pouring spout on 70
74 window in 70
76 selector band
78 aperture in 76
80 finger flange on 76
82 thumb of 28
84 coffee maker
86 base
88 heating coil in 86
90 hot plate on 86
92 stanchion support
94 water reservoir in 92
96 overhead portion
98 fill opening in 96
100 dual water feed system in 96
102 removable filter basket
104 underside of 96
106 chamber in 102
108 filter
110 measure of ground coffee
112 slot in 102
114 base
116 heating coil in 114
118 hot plate on 114
120 stanchion support
122 water reservoir in 120
124 overhead portion
126 receptacle on 124
128 water feed system
130 removable cover 132 filter housing
134 underside of 124
136 chamber in 132
138 slot in 124 and 136

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A multiple beverage dispenser which comprises:
   a) a container having an opened neck;
   b) a handle on said container to be gripped by a hand of a person;
   c) means within said container for dividing said container into two separate compartments for holding two different types of beverages therein, wherein said dividing means is a partition extending down from said open neck to the bottom of said container; and,
   d) means on said opened neck of said container for selectively discharging each of the beverages from each said compartment within said container, wherein said selectively discharging means includes a collar which fits about said opened neck of said container; and, a ring having a pouring spout that rides upon said collar, so that said ring can be manually manipulated on said collar to position said pouring spout over one of said compartments.

2. A multiple beverage dispenser as recited in claim 1, further including means for covering said compartments within said container after the two different types of beverages are deposited therein.

3. A multiple beverage dispenser as recited in claim 2, wherein said covering means is a disc shaped lid which fits into said ring.

4. A multiple beverage dispenser as recited in claim 3, wherein said disc shaped lid is divided into two semicircular segments which are held together by a hinge, so that each said semicircular segment can cover over one said compartment.

5. A multiple beverage dispenser as recited in claim 4, further including:
   a) said partition having a flexible cam seat along a top edge; and
   b) said disc shaped lid having a cam portion along said hinge, so that said disc shaped lid in an opened position can be adjusted, allowing said cam portion to sit properly on said flexible cam seat.

6. A multiple beverage dispenser as recited in claim 5, further including means for retaining said semicircular segments in the opened position.

7. A multiple beverage dispenser as recited in claim 6, wherein said retaining means includes:
   a) a female socket formed in a top surface of said first semicircular segment; and
   b) a male plug formed on a top surface of said second semicircular segment, so that when said disc shaped lid is in the opened position, said male plug will mate with said female socket.
   b) a selector band having an aperture and a finger flange opposite from said aperture, said selector band rotatively fits within said cap, with said aperture at said pouring spout and said finger flange extending through said window, so that a thumb of a hand gripping said handle can slide said finger flange left and right to move said aperture at said pouring spout back and fourth over one of said compartments.

8. A multiple beverage dispenser as recited in claim 7, further including a dual system electronic coffee maker, so that said compartments within said container can receive separately, any combination of brewed coffee, such as regular and decaf from said coffee maker.

9. A multiple beverage dispenser as recited in claim 8, wherein said coffee maker includes:
   a) a base having a heating coil therein;
   b) a hot plate mounted on said base which said container sits upon;
   c) a stanchion support having a water reservoir therein extending upwardly from said base;
   d) an overhead portion having a fill opening and dual water feed system extending outwardly from said stanchion;
   e) a removable filter basket carried on the underside of said overhead portion over said container, said filter basket having two chambers in which each receives a filter and a measure of ground coffee, so that when a pre-measured quantity of water is introduced through said fill opening the water in said reservoir will be heated to a brewing temperature, travel through said dual water feed system and go into each said chamber past the ground coffee and filter to be discharged into each said compartment in said container.

10. A multiple beverage dispenser as recited in claim 9, wherein said removable filter basket further includes a slot extending upwardly between said chambers, so that said semicircular segments of said disc shaped lid in the opened position can fit into said slot, so as to allow said container to be placed in a proper orientation onto said hot plate.

11. A multiple beverage dispenser as recited in claim 8, wherein said coffee maker includes:
   a) a base having a heating coil therein;
   b) a hot plate mounted on said base which said container fits upon;
   c) a stanchion support having a water reservoir therein extending upwardly from said base;
   d) an overhead portion extending outwardly from said stanchion;
   e) a pair of receptacles extending upwardly from said overhead portion, each said receptacles having an open top to receive a measure of ground coffee and a water feed system;
   f) a pair of removable covers, to fit over said open tops of said receptacles;
   g) a filter housing on the underside of said overhead portion over said container, said filler housing having two chambers in which each receives a filter and is fluidly connected to one said water feed system, so that when a pre-measured quantity of water introduced into said water reservoir in said stanchion is heated to a brewing temperature, it will travel into each said receptacle past the ground coffee through each said water feed system and go into each said chamber past the filter to be discharged into each said compartment in said container.

12. A multiple beverage dispenser as recited in claim 11, wherein said overhead portion with said filter housing includes a slot extending upwardly between said chambers, so that said semicircular segments of said disc shaped lid in the opened position can fit into said slot, so as to allow said container to be placed in a proper orientation onto said hot plate.

13. A multiple beverage dispenser as recited in claim 1 further including:

a) said opened neck having external threads thereabout; and b) said collar having internal threads which engage with said external threads on said opened neck.

14. A multiple beverage dispenser as recited in claim 1, wherein said selectively discharging means includes:

a) a cap having a pouring spout and a window opposite from said pouring spout, said cap fits onto said opened neck of said container; and b) a selector band having an aperture and a finger flange opposite from said aperture, said selector band rotatively fits within said cap, with said aperture at said pouring spout and said finger flange extending through said window, so that a thumb of a hand gripping said handle can slide said finger flange left and right to move said aperture at said pouring spout back and fourth over one of said compartments.

* * * * *